US008121050B2

(12) United States Patent
Liu

(10) Patent No.: US 8,121,050 B2
(45) Date of Patent: Feb. 21, 2012

(54) MAINTAINING TIME OF DAY SYNCHRONIZATION

(75) Inventor: Yuh-Jih Liu, Ledgewood, NJ (US)

(73) Assignee: Exelis Inc., McLean, VA (US)

( * ) Notice: Subject to any disclaimer, the term of this patent is extended or adjusted under 35 U.S.C. 154(b) by 79 days.

(21) Appl. No.: 12/756,575

(22) Filed: Apr. 8, 2010

(65) Prior Publication Data

US 2011/0249688 A1    Oct. 13, 2011

(51) Int. Cl.
*H04J 1/16* (2006.01)
*H04J 3/06* (2006.01)
(52) U.S. Cl. .................. 370/252; 370/512
(58) Field of Classification Search .................. None
See application file for complete search history.

(56) References Cited

U.S. PATENT DOCUMENTS

| | | | | |
|---|---|---|---|---|
| 5,072,445 | A * | 12/1991 | Nawata | 370/324 |
| 7,187,903 | B1 * | 3/2007 | Febvre et al. | 455/13.2 |
| 2004/0005902 | A1 * | 1/2004 | Belcea | 455/502 |
| 2004/0252646 | A1 * | 12/2004 | Adhikari et al. | 370/252 |

OTHER PUBLICATIONS

Kun Sun et al., "Secure and Resilient Clock Synchronization in Wireless Sensor Networks," IEEE Journal on Selected Areas in Communications, vol. 24, No. 2, Feb. 2006; pp. 395-408.
Alexander Hanzlik et al., "A Composable Algorithm for Clock Synchronization in Multi-Cluster Real-Time Systems," ITT Corporation. Dowloaded on Apr. 13, 2009 at 12:26 from IEEE Explore; 12 pages
Michael Mock et al., "Continuous Clock Synchronization in Wireless Real-Time Applications," IEEE 2000; pp. 125-132.
Santashil PalChaudhuri et al., "Adaptive Clock Synchronization in Sensor Networks," IPSN '04, Apr. 26-27, 2004, Berkeley, CA; Copyright 2004 ACM; pp. 340-348.
Mihail L. Sichitiu et al., "Simple, Accurate Time Synchronization for Wireless Sensor Networks," 2003 IEEE; pp. 1266-1273.
Ali Burak Kulakli et al., "Time Synchronization Algorithms Based on Timing-Sync Protocol in Wireless Sensor Networks," 2008 IEEE; 5 pages.

* cited by examiner

*Primary Examiner* — Nittaya Juntima
(74) *Attorney, Agent, or Firm* — Edell, Shapiro & Finnan, LLC

(57) ABSTRACT

A technique for maintaining time synchronization between network nodes involves broadcasting a timing signal from a source node to its neighbors. The timing signal is transmitted in a dedicated source time slot of a super epoch comprising a number of epochs each having a number of time slots. A reply timing signal is received at the source node from a neighboring node designated as the destination node, where the reply timing signal is received in a dedicated destination time slot of the super epoch. The clock drift and propagation delay between the source and destination nodes are computed at the source node. At the neighboring nodes other than the destination node, clock drift can be computed using previous estimates of propagation delay. RTS and CTS exchanges from PTP packets can also be used to estimate the propagation delay in the source node and the clock drift in the destination node.

15 Claims, 11 Drawing Sheets

MAINTAINING TIME OF DAY SYNCHRONIZATION

BACKGROUND

In wireless and ad-hoc communication networks, time synchronization is often necessary in order for two communication devices to communicate successfully. For channel access using time division multiple access (TDMA), accurate slot alignment requires time of day (TOD) synchronization. For military communications, synchronization is especially important because of the requirements of communication security.

Synchronization schemes depend upon the transmission of timing signals for clock alignments. These timing signals could contain timing information in the fraction microsecond range for accuracy. Global positioning system (GPS) signals can be used to establish TOD synchronization. For a communication device with GPS, the GPS timing signal sent internally at the GPS 1 pulse per second (pps) rate can be used to align the local real time clock (RTC) to the GPS clock. If every communication device in the network has GPS, TOD synchronization is straightforward when the GPS provides periodic time references. However, under real-world operating conditions, this is often not the case, and some mechanisms must be provided to align the clocks of different communication devices. For a communication device without GPS, the communication device has to depend upon the reception of timing signals transmitted from another node to synchronize the clock.

Time synchronization algorithms can be classified as pairwise and/or global. In pair-wise synchronization, synchronization is achieved between pairs of nodes. In global synchronization, all the nodes in the network must have clock synchronization. Algorithms for global synchronization can be further classified into two categories: level-based synchronization and diffuse-based synchronization. In a level-based synchronization, the network is organized into a level hierarchy and clock synchronization is established level by level from the source to all the nodes in the lower levels. The level architecture could be a tree or cluster depending upon the network formation methods and the source is normally either a cluster head or a root node. In a diffuse-based synchronization, no particular network architecture is assumed to spread the synchronization information to the entire network.

Many existing synchronization schemes are designed to set up synchronization for all the nodes in a network (i.e., synchronization acquisition). However, few, if any, synchronization schemes have been proposed that focus on the problem of maintaining synchronization once it has been established (i.e., synchronization "tracking"). Additionally, there are few, if any, discussions about the detailed signaling structures for the timing signals used for different synchronization schemes.

Normally, timing signals are sent using a different transmission scheme so as not to interfere with the regular data being exchanged between communication devices. For example, timing signals can be sent using different frequencies. In an acquisition mode, communication bandwidth is not usually wasted, since normal data communication has not started and the receiver can afford to search for timing signals. Once the data communication begins and synchronization is in a tracking mode, it is a problem if the receivers do not know when to tune the communication device to the correct frequency to receive the timing signals. Thus, valuable data bandwidth can be wasted in the tracking mode waiting for the receiver to search for the timing signals, resulting in reduced throughput for data communications.

Another shortcoming of current TOD synchronization schemes is the inability to maintain time synchronization in a tracking mode after an initial synchronization in an acquisition mode. In acquisition modes, nodes search for the timing signals to align their clocks. If the timing signal is received and if at least one neighbor is found, the nodes switch to the tracking mode. While in the tracking mode, initial clock alignments cannot guarantee future clock alignments because of clock drift, and as a result, the network nodes need to search for timing signals for clock alignments. Thus, network nodes sometimes have difficulty maintaining time synchronization in the tracking mode.

In data communications using carrier sense multiple access with collision avoidance (CSMA/CA) protocols, the exchanges of request to send (RTS) signals and clear to send (CTS) signals before the start of a message transmission can be used to estimate clock drift.

In an ad-hoc network, neighbor discovery is crucial, and as a result, one-way transmissions of hello RTS (HRTS) signals from each node is often necessary. To compensate for the problems arising during infrequent PTP data traffic, the one-way transmissions of HRTS signals can be used to estimate clock drift. However, in doing so, the network assumes that a destination node has knowledge of the internal delays in the source node. This is because the destination node only knows that the HRTS is sent from the beginning time slot of a timing signal. The destination node, however, does not always know the internal delays in the source node, as there can be delays from the beginning time slot of a timing signal to the start of transmission (SOT) of the timing signal. These delays can be due to the processor, the modem, transmission security, propagation delays and other reasons. Thus, inaccurate estimations of time delays could lead to problems in achieving time synchronization.

SUMMARY

In accordance with the present invention, a technique and apparatus for maintaining time synchronization between network nodes are provided. Subsequent to an initial synchronization of the source node with respect to its neighbors, a timing signal is broadcast from the source node. The broadcast timing signal is transmitted in a dedicated source time slot of a super epoch comprising a plurality of epochs each having a plurality of fixed time slots. The timing signal includes fields that identify the source node, a destination node designated for responding to the timing signal, and the transmission time of the timing signal as measured by the source node. A reply timing signal is transmitted from the destination node to the source node in a dedicated destination time slot of the super epoch, and the reply timing signal indicates a transmission time of the reply timing signal at the destination node. A propagation delay between the source node and destination node is computed at the source node based on the transmission time of the timing signal and the reception time of the reply timing signal. A clock drift is computed at the source node based on the transmission time of the timing signal, the transmission time of the reply timing signal, and the reception time of the reply timing signal. Since the timing signal is broadcast by the source node, not only does the destination node receive the timing signal but also all of the neighbors of the source node receive the timing signal. While these other neighboring nodes do not respond to the timing signal, they nevertheless can use the one-way timing signal to estimate their own clock drift relative to the source node using an estimate of propagation delay, the transmission time of the timing signal, and the reception time of the timing signal.

In a CSMA environment, an estimate of clock drift can be determined from exchanges of RTS and CTS messages. In response to receiving an RTS message from a source node, a destination node records the reception time and sends a CTS message back to the source node. In response to receiving the CTS message, the source node determines the propagation delay from the transmission time of the RTS message, the reception time of the CTS message, and a known turn-around time. The source node supplies the transmission time of the RTS message and the computed propagation to the destination node in the subsequent data message, which allows the destination node to compute the clock drift relative to the source node and to adjust its clock accordingly.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
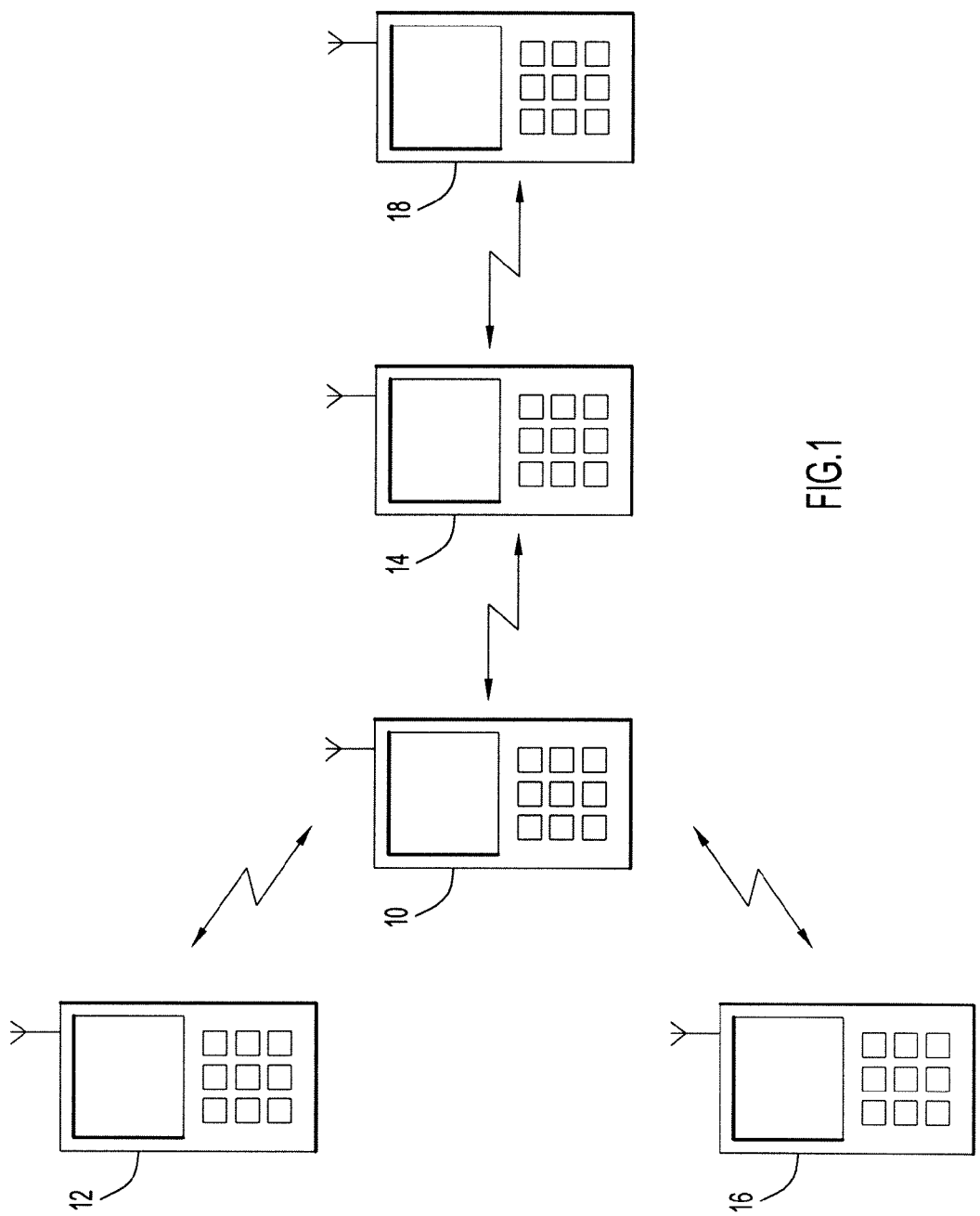
FIG. 1 is a top-level block diagram of an ad hoc network environment.

The techniques described herein relate to maintaining time of day (TOD) synchronization in a tracking mode after network formation is complete and after the initial success of real time clock (RTC) alignments in an ad hoc wireless network. To solve the problem of maintaining time synchronization for communication devices in a network, according to one aspect of the present invention, a TDMA timing structure is used in which a portion of the transmission timeline is reserved for exchanges of timing signals with timing packets. It will be understood that the present invention is not limited to any particular TDMA timing structure and that any timing structure with reserved portions of a transmission timeline can be used. The timing structure introduces timing overhead, but the design of the timing structure alleviates the problem of quiet periods by maintaining TOD synchronization when no synchronization tracking would otherwise occur due to long gaps in data communications between network nodes.

The scheme for transmitting timing signals with timing packets is designed so that a receiving node knows when to tune to or "listen for" timing signals. The timing packets include time of day (TOD) information and, after an exchange of timing signals with a destination node, can be used at the source node to compute an estimated propagation delay and clock drift from a single exchange. The timing packets can also be used by the neighbors of the source node other than the destination node to compute an estimated clock drift. The exchange of timing signals between a source node and destination node does not depend upon the availability or frequency of data transmissions, and the exchange is designed so that an estimate of clock drift and propagation delay can be computed independent of each other at a source node. This means that knowledge of the clock drift is not required to compute the propagation delay, and knowledge of the propagation delay is not required to compute the clock drift at the source node. At the neighboring nodes, the computed clock drift requires only the knowledge of a previously computed propagation delay. If subsequent point-to-point (PTP) data messages are exchanged between source and its neighbors, then an opportunity exists to supply to the neighbors the propagation delay determined at the source node, which can then be used by the neighbors to estimate the clock drift and to adjust clock misalignments.

Time synchronization can also use a combination of CSMA and TDMA approaches. In one implementation of the present invention, time synchronization is maintained in a CSMA environment. For time synchronization in a CSMA environment, exchanges of RTS and CTS are utilized to compute an estimate of clock drift and propagation delay. The availability of CSMA packets enhances the probability of successful time synchronization.

According to another option, clock drift can be calculated using one-way HRTS transmissions. However, for one-way HRTS transmissions, the transmission time at the source node of the HRTS is not sent to its neighbors from the HRTS, and each neighboring node needs to estimate the transmission time by assuming that the neighboring node and the source node have the same delays from the beginning of the time slot to the start of transmission (SOT). The neighboring node has further to assume that there is a close alignment at the beginning of the time slot for both the source node and the neighboring node. This also means that there may be inaccuracies in the estimate of clock drift from the one-way HRTS transmissions because there are many unknowns.

The techniques relating to maintaining time synchronization and calculating the clock drift and propagation delay, described in detail below, can be employed in a network environment such as that illustrated conceptually in FIG. 1. A plurality of communication devices 10, 12, 14, 16, and 18 communicate over wireless links, for example, in an ad hoc network. Each of these communication devices can operate as a source node that initiates communication with another communication device and also can operate as a destination node that is the recipient of communication initiated by another communication device. In FIG. 1, communication devices 12, 14, and 16 are the immediate neighbors of communication device 10, and communication device 10 is able to transmit signals directly to and to receive signals directly from these communication devices. Communication device 18 is not a neighbor of communication device 10; however, devices 10 and 18 can communicate via communication device 14, which serves as an intermediate node between devices 10 and 18. It will be appreciated that the invention is not limited to any particular types of network devices or network architectures. The techniques described herein relating to maintaining time synchronization and calculating clock drift and propagation delay can be performed by one or more communication devices located at any point throughout the network environment, such as one or more of the devices shown in FIG. 1.

Figure 2:
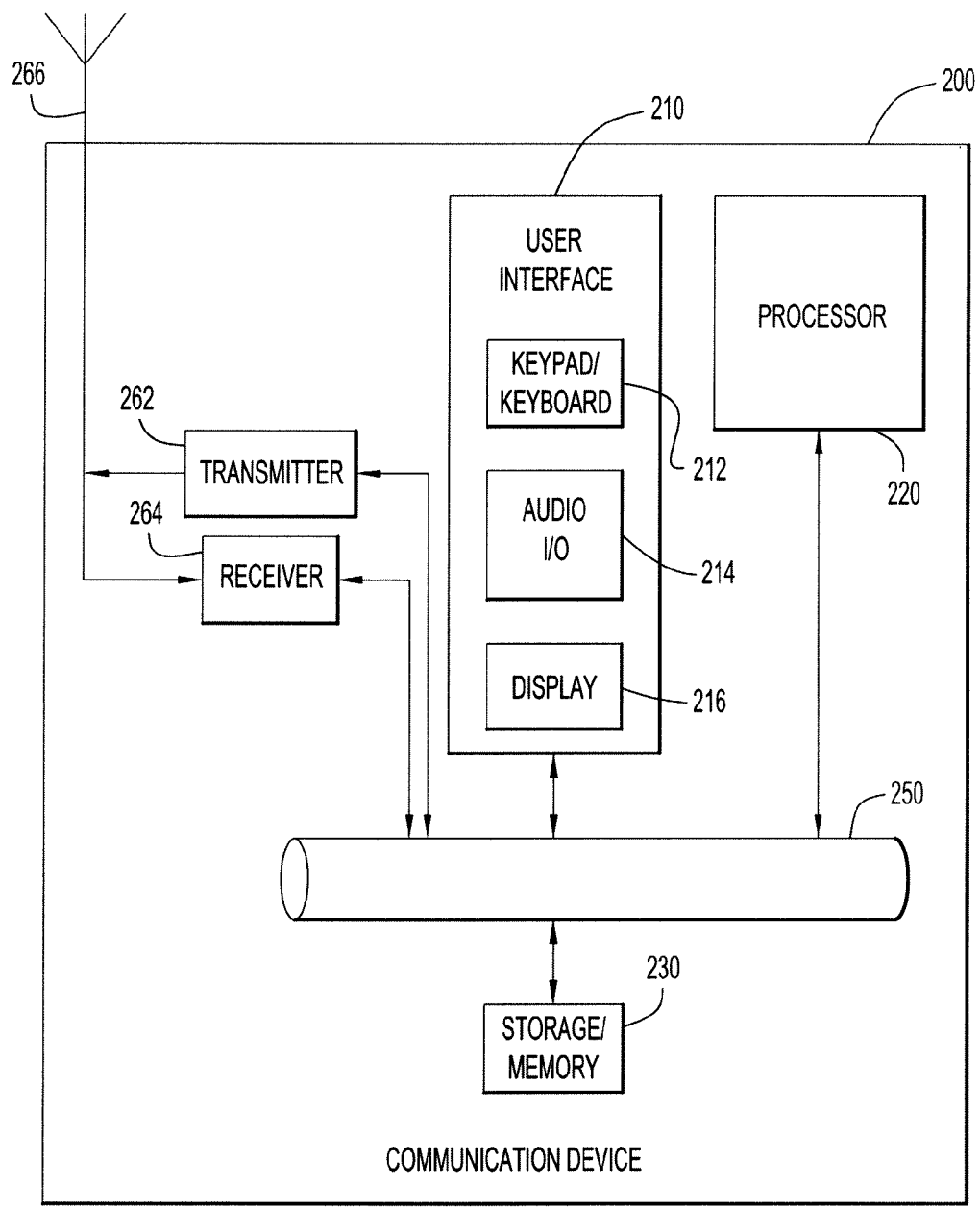
FIG. 2 is a block diagram of a communication device suitable for use in a network environment.

FIG. 2 is a block diagram illustrating an example of a communication device 200 that is configured to determine a clock drift between its own clock and the clock of the neighboring communication device using timing signals and, in certain instances, to compute the propagation delay to a neighboring communication device, as described in greater detail below. As used herein, a communication device can be any device capable of transmitting and/or receiving signals, including but not limited to: a fixed-position or mobile RF transmitter or receiver, a handheld or body-mounted radio; any type of wireless telephone (e.g., analog cellular, digital cellular, or satellite-based); a pager or beeper device; a PDA or smart phone; a radio carried on, built into or embedded in a ground-based or airborne vehicle; a satellite-mounted transmitter or receiver; or any electronic device equipped with wireless transmission or reception capabilities, including multimedia terminals capable of transmitting and/or receiving audio, video, and data information.

Communication device 200 includes a transmitter 262 and a receiver 264 coupled to an antenna 266 for transmission and reception of signals. Transmitter 262 is capable of transmitting timing signals through antenna 266 to neighboring communication devices in the network. Receiver device 264 is capable of receiving timing signals through antenna 266 from neighboring communication devices in the network. Transmitter 262, receiver 264, and antenna 266 can be configured to communicate virtually any type of content, including but not limited to: data signals, audio/voice signals, video or visual display signals, and any other types of media or content.

Communication device 200 includes a user interface 210 that allows a user to interact with device 200 (e.g., send and receive voice or audio signal; enter text, data, commands, etc.; and view images, video, text, data, etc.). User interface 210 includes a display device 216, user input devices such as a keypad/keyboard 212, and an audio input/output 214 such as a microphone and speaker. Display device 216 can be any of a wide variety of known devices, such as an LCD display. Keypad/keyboard 212 allows the user to enter alphanumeric characters and can be configured as a physical device and/or as a keyboard or keypad depicted on display device 216. In the latter case, characters can be selected by moving a cursor, or by touching the screen in the case of a touch-screen display. It will be appreciated that user interface 210 may include other types of user-input devices such as a cursor control device, joystick, etc.

Communication device 200 further includes a processing capability represented in FIG. 2 by processor module 220. Processor 220 is capable of executing program instructions (i.e., software) for carrying out various operations and tasks. For example, processor 220 can interpret data and commands received from the transmitter and the receiver, perform computations, cause information to be stored, and control the display 216 of user interface 210. Processor 220 is, for example, a microprocessor, a microcontroller, a digital signal processor, etc.

A storage capability of device 200 is represented by storage/memory module 230, which can store information relating to the timing signals, timing packets, propagation delay, and clock drift, as well as other data or information. Storage/memory module 230 can also store program instructions (i.e., software) to be executed by processor 220 to carry out operations. Thus, the operations and methodologies described herein can be carried out by executing instructions stored on a computer readable medium (i.e., software) on a processor or processors located within communication device 200. As used herein, the term "computer readable medium" refers to tangible media (e.g., memory or storage devices). Storage/memory module 230 is a tangible processor-readable or computer-readable memory that stores or is encoded with instructions that, when executed by processor 220, cause processor 220 to perform the functions described herein. While FIG. 2 shows a processing environment comprising a data processor 220 that executes software stored in storage/memory module 230, an alternative processing environment is a fixed data processing element, such as an application specific integrated circuit (ASIC) that is configured, through fixed hardware logic, to perform the functions of the logic. Yet another possible data processing environment is one involving one or more field programmable logic devices, or a combination of fixed processing elements and programmable logic devices.

The interconnections between the components of network-connected device 200 are represented generally in FIG. 2 with a bus structure 250. In general, user interface 210, processor 220, storage/memory module 230, transmitter 262, and receiver 264 can be interconnected in any suitable manner.

Figure 3:
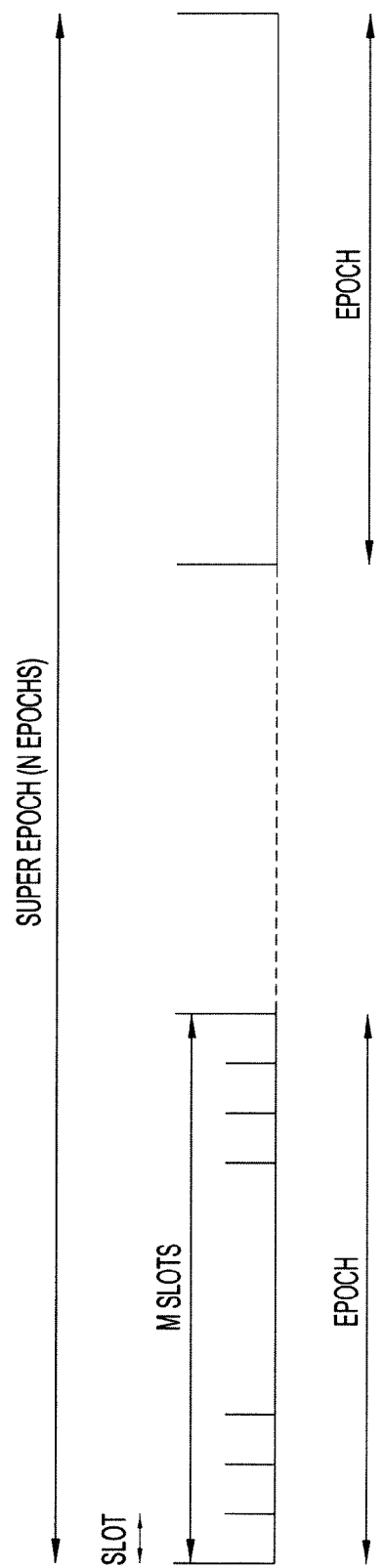
FIG. 3 is a diagram of a super epoch showing a plurality of epochs with fixed time slots.

Operation of communication devices serving as source and neighboring nodes within a network to maintain synchronization will now be described. In an example embodiment of the present invention, time synchronization is maintained in a TDMA environment. It should be appreciated, however, that the invention is not limited to any particular TDMA format, and that the present invention applies to any format with defined time slots or periods. In the TDMA timing structure, fixed time slots are dedicated for timing signal transmissions and receptions. As shown in FIG. 3, time can be segmented into super epochs. Each super epoch comprises N consecutive epochs, and each epoch can be divided into M time slots. For example, if each time slot is 1.5 ms and each epoch is 90 ms, then M=60. If N=8, then each super epoch lasts 0.72 second.

The scheme described herein involves dedicating or reserving two time slots in each super epoch for exchanging timing signals between two nodes to support tracking of synchronization after initial synchronization. One time slot is used to transmit a timing signal from a source node to its neighbors, and the other time slot is used to transmit a reply timing signal back to the source node from one of the neighboring nodes designated by the timing signal as the destination node. Within each N-epoch super epoch, any two adjacent time slots can be dedicated for transmission of these timing signals. For example, the first two time slots in a super epoch can be dedicated for the timing signals.

Figure 4:
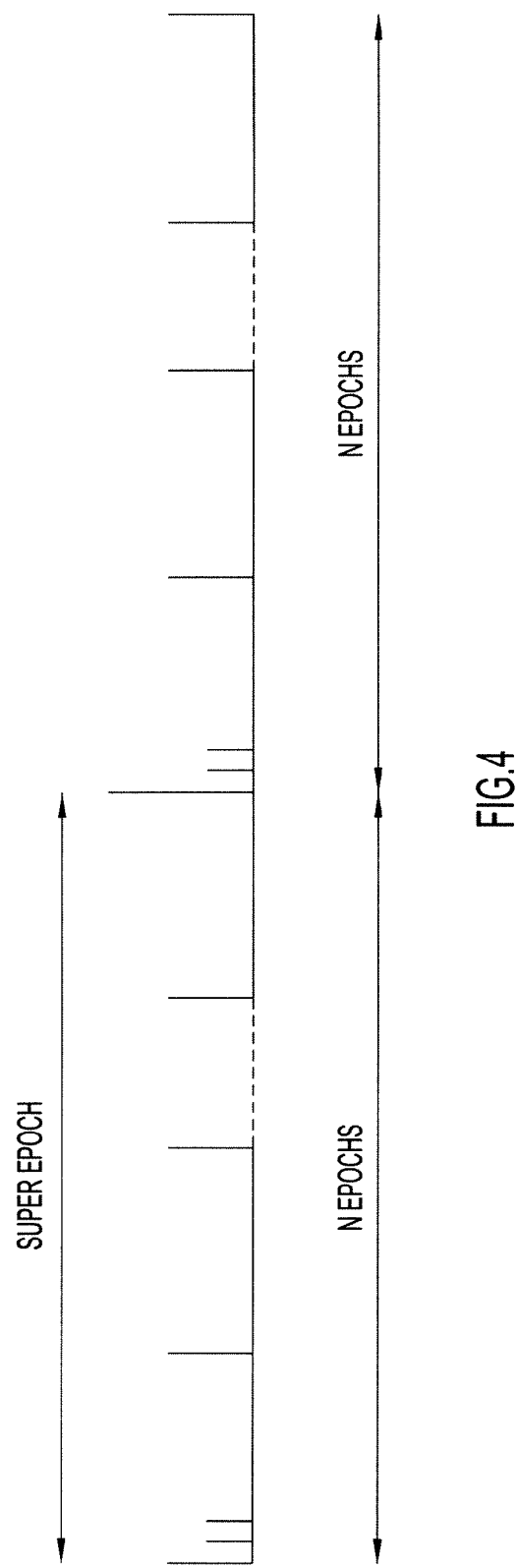
FIG. 4 is a diagram of multiple super epochs, each having N epochs, including two time slots reserved for sending timing signals.

FIG. 3 shows one such implementation of a super epoch timing structure. In FIG. 3, time is segmented into a repetition of N epochs, with each epoch being divided into M time slots. The parameter N can be adjusted depending upon the operational requirements of the network. FIG. 4 shows two successive super epochs, each containing N epochs. In the example shown in FIG. 4, the first two time slots in each super epoch are dedicated or reserved for transmission of the timing signals.

Figure 5:
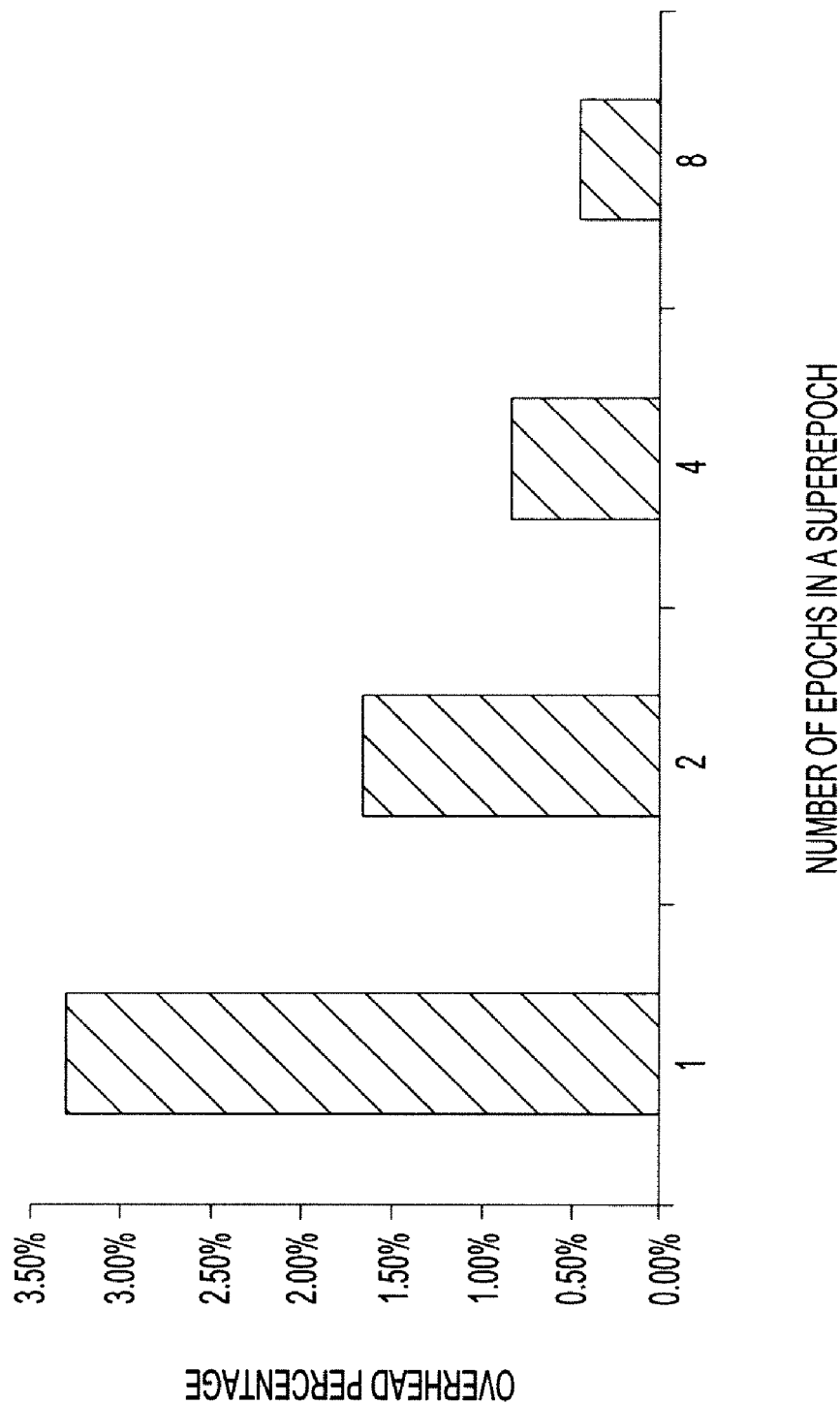
FIG. 5 is a graph illustrating the overhead percentage for different numbers of epochs in a super epoch.

Since time slots are reserved for sending timing packets, these reserved slots essentially create overhead in the sense that these slots cannot be used to transmit data packets containing content (voice signals, text, data, images, video, etc.). The overhead percentage depends on the selection of N, the number of epochs in a super epoch. FIG. 5 is a graph illustrating the overhead percentage for four different values of N: 1, 2, 4, and 8, for the number of epochs in a super epoch. FIG. 5 assumes a value of M=60, or 60 time slots in every epoch. For example, assuming there are four epochs in each super epoch, and assuming 60 time slots in each epoch, then N=4 and M=60. In this case, there are a total of 240 time slots in each super epoch, and two of those time slots are dedicated for the timing signals (i.e., two slots in every four epochs). Thus, when N=4, about 0.833% of the time slots in each super epoch are dedicated for the timing signals. As N decreases, two slots are still dedicated for the timing signals in each super epoch, but the super epochs are shorter in time and overhead increases. However, faster detection of clock misalignments can be achieved, since the dedicated time slots occur more frequently over a period of time. If N increases, there are fewer opportunities to send timing packets but overhead decreases. For example, as shown in FIG. 5, in order for the overhead percentage to be less than 1%, the number of epochs in a super epoch must be at least 4. Thus, there is a tradeoff between timing packet overhead and the frequency of opportunities to maintain synchronization.

Figure 6:
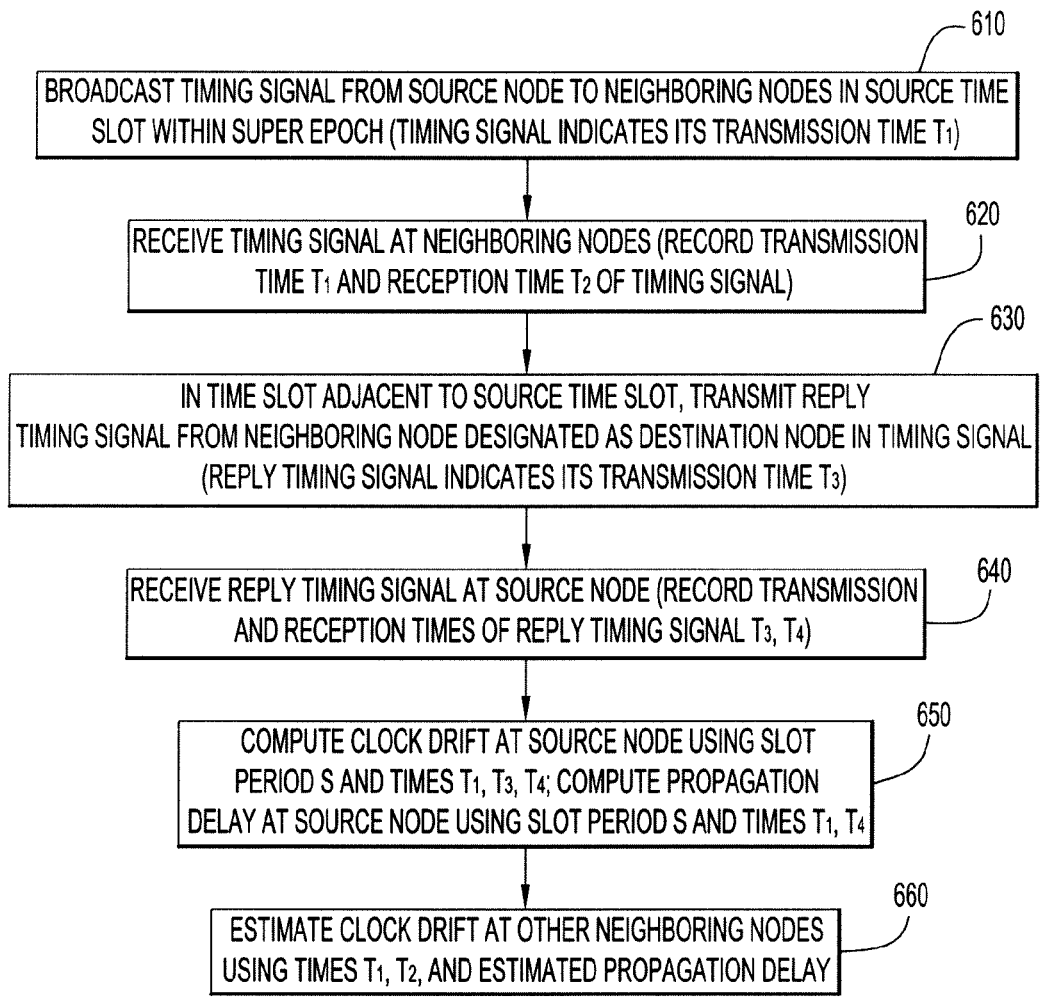
FIG. 6 is a functional flow diagram of operations performed by a source node and its neighboring nodes to maintain synchronization using dedicated time slots in a TDMA scheme.

FIG. 6 shows a functional flow diagram of operations performed to maintain synchronization (i.e., synchronization tracking) between a source node and its neighbors in a network. In operation 610, the source node broadcasts a timing signal to its neighboring nodes. The timing signal designates one of the neighboring nodes as a destination node. For example, referring to FIG. 1, communication device 10 can operate as the source node, and any of neighboring communication devices 12, 14, and 16 can serve as the destination node. Once the transmission time $T_1$ of the timing signal has been scheduled, the source node can store or record the transmission time for subsequent computations.

In the case where the first two time slots in each super epoch are dedicated for the timing signals, the timing signal is initiated from the dedicated source time slot corresponding to the first time slot of the super epoch. A node will either transmit (in the case of the source node) or will listen (in the case of neighbors of the source node) in the dedicated source time slot. If there is a timing packet scheduled for transmission in the dedicated source time slot, the node acts as the source node and will transmit the timing signal. Otherwise, the node assumes that it is potentially an intended recipient of a timing signal and will listen for a timing signal that may have been sent. Because a dedicated time slot with a known timing is used as the source time slot, any listening nodes do not need to search in time for the timing signal. While, in principle, every super epoch could be used to exchange timing signals, to avoid channel contention, communication devices can be configured to schedule timing signal exchanges intermittently and in a staggered manner. According to one approach, every node can schedule a transmission according to the following formula:

$$\text{Timer}=T_a+\text{random}(T_b*N_{nbr}) \quad (1)$$

where $T_a$ is the minimum time separation for sending timing packets, $N_{nbr}$ is the number of neighbors, and $T_b$ is the time parameter to control neighbor transmission. According to equation (1), as the number of neighboring nodes increases, the time separation also increases to prevent the probability of two neighbors sending at the same time from increasing. The second term of equation (1) intends to separate or stagger the sending time for different neighbors. If the timer expires during a particular super epoch but after the first dedicated source time slot of that super epoch, the node waits until the first dedicated source time slot of the next super epoch for transmission of the timing signal.

Figure 7:
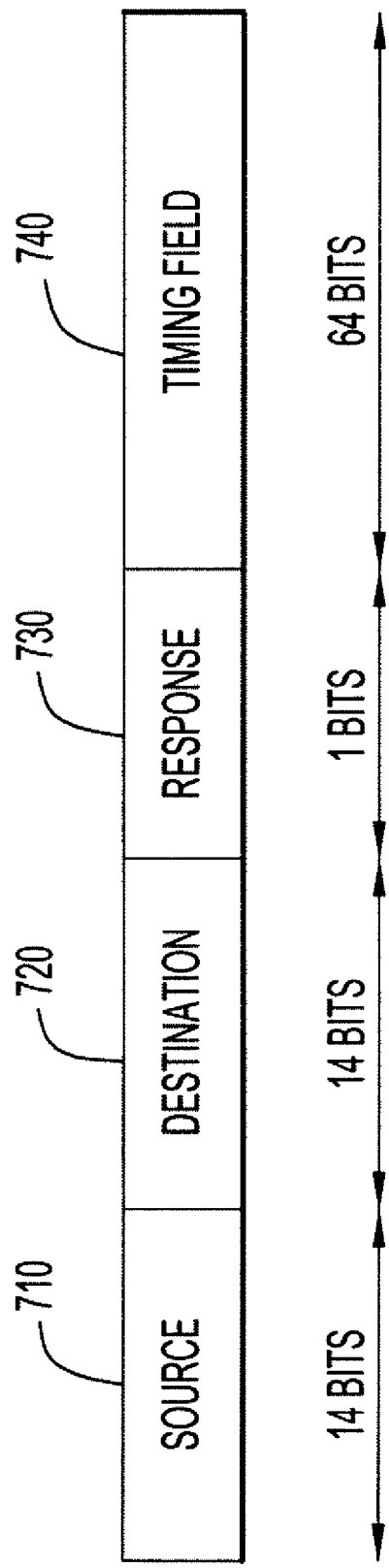
FIG. 7 is a diagram illustrating a timing packet format for TDMA timing signals.

FIG. 7 depicts an example of a timing packet for a TDMA timing signal. The timing packet has four major fields: a source field 710, a destination field 720, a response field 730, and a timing field 740. Source field 710 identifies the source node and can be, for example, 14 bits in length. Similarly, destination field 720 identifies the destination node and can be, for example, 14 bits in length. Response field 730 can be a single bit (e.g., a flag) that indicates whether the packet is a timing signal transmitted from a source node or a reply timing signal transmitted from a destination node. Timing field 740 contains the transmission time of the packet. For example, timing field 740 can be a 64 bit field that specifies information such as the day, hour, minute, second, millisecond, microsecond, and/or fractional microsecond that defines the transmission time.

At a time that the source node is scheduled to broadcast a timing signal, the source node can choose to exchange timing signals with its neighbor with the most recent clock update. This can be achieved if every node in the network informs its neighbors of clock updates through neighbor discovery packets. An example of a neighbor discovery packet is a conventional HELLO packet. If a source node does not have any clear choices in selecting a neighbor for synchronization, the source node can choose the neighbor from which it obtained its most recent clock update. When a source node selects a neighbor, a station ID particular to that neighbor is inserted into destination field 720, and response field 730 is set to "1" to indicate that a response to the packet is required (i.e., a reply timing signal). The source node station ID is inserted into source field 710, the current transmission time $T_1$ of the timing signal is inserted into timing field 740, and the timing packet of the timing signal is sent during the dedicated source time slot of the super epoch, e.g., the first time slot of the super epoch. The timing packet of the timing signal is sent out as a broadcast to multiple neighbors or multiple nodes within a network while the destination field specifies the neighbor designated for response.

Referring again to FIG. 6, in operation 620, all of the neighboring nodes, including the destination node, receive the timing packet transmitted by the source node and record the reception time $T_2$ of the timing signal and the transmission time $T_1$ of the timing signal (supplied in timing field 740). The destination node is the neighbor that has a station ID that matches the station ID in destination field 720 of the timing packet.

The flag in response field 730 of the timing signal is set to a value of "1," which indicates to the destination node that a reply timing signal is required. Accordingly, in operation 630 the neighboring node designated as the destination node transmits a reply timing signal with a response timing packet back to the source node. In the response timing packet, source field 710 is filled with the station ID of the destination node (which is now transmitting the reply timing signal), and destination field 720 is filled with the station ID of the source node (which is the destination of the reply timing signal). The flag in response field 730 is set to "0" to indicate to the source node that no reply timing signal is required in response. Additionally, the transmission time $T_3$ of the reply timing signal is inserted into timing field 740 of the response packet of the reply timing signal. The response packet is sent in a dedicated destination time slot, for example, the second time slot in the super epoch, adjacent to the first time slot in which the timing signal was sent.

In operation 640, the source node receives the response packet of the reply timing signal from the destination node and records the transmission time $T_3$ of the reply timing signal (supplied in timing field 740 of the response packet) and the reception time $T_4$ of the reply timing signal. Since the flag in response field 730 of the response packet is set to "0," the source node does not send a further timing packet back to the destination node. It will be appreciated that the timing packets are not limited to the embodiments described above and that alternate configurations for the timing packets can be transmitted between network nodes.

Figure 8:
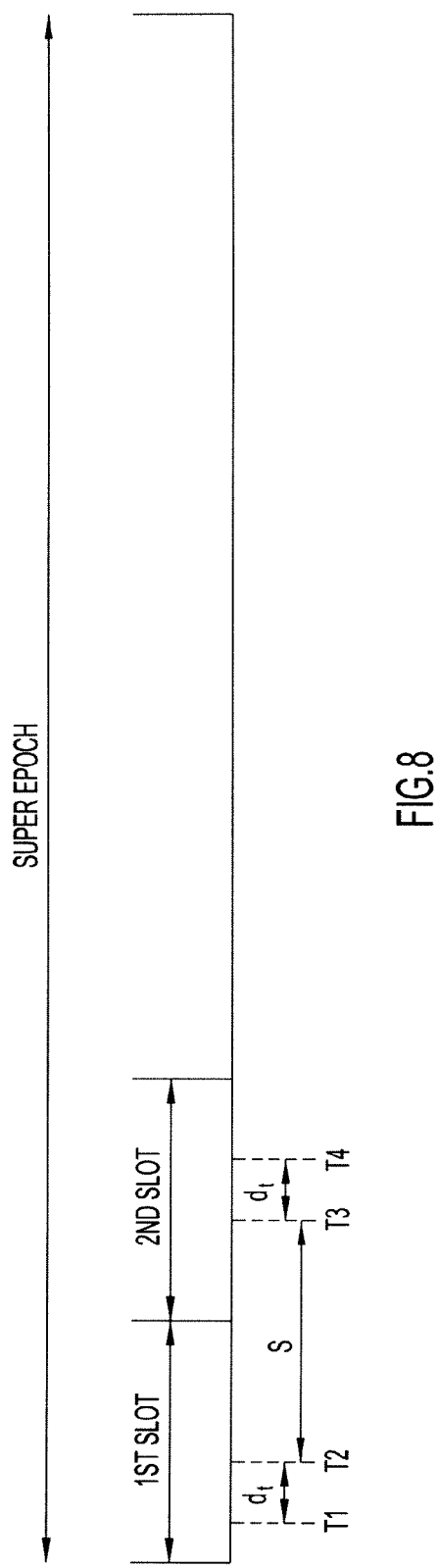
FIG. 8 is a timing diagram illustrating the transmission and reception times of two timing signals respectively transmitted during two dedicated time slots within a super epoch.

FIG. 8 shows the timing in an example where the first two time slots of a super epoch are used to exchange timing signals between a source node and its neighbors. The timing signal is transmitted by the source node in the first time slot at a time $T_1$. Time $T_1$ is measured by the source node according to its own clock. After the propagation delay $d_t$ required to traverse the distance between the source and neighboring nodes, the timing signal arrives at the neighboring node during the first time slot at time $T_2$. Time $T_2$ is measured by each neighboring node that receives the timing signal, including the destination node, according to its own clock, which may have drifted relative to the clock of the source node. In general, time $T_2$ will be different for each neighboring node, depending on its distance from the source node. The reply timing signal is transmitted by the neighbor designated as destination node in the second time slot at a time $T_3$. Time $T_3$ is measured by the destination node according to its own clock. Time $T_3$ is selected by destination node to be a slot period S after the arrival time $T_2$ of the timing signal. After the propagation delay $d_t$ required to traverse the distance between the destination and source nodes, the reply timing signal arrives at the source node during the second time slot at time $T_4$. Time $T_4$ is measured by the source node according to its own clock.

Once the source node has received the reply timing signal, the source node has the necessary information to compute both the clock drift between the clocks of the source and destination nodes and the propagation delay between the source and destination nodes (which indicates the range between the two communication devices). Accordingly, in operation 650, the source node computes the clock drift and propagation delay using the following methodology.

When the clock at the destination node is running ahead of the clock at the source node by a value c, then the following relationships are true:

$$T2 = T1 + d_t + c \tag{2}$$

$$T3 = T2 + S \tag{3}$$

$$T4 = T3 + d_t - c \tag{4}$$

As previously noted, the times $T_1$ and $T_4$ are measured at the source node, and the times $T_2$ and $T_3$ are measured at the destination node. The negative sign in equation (4) indicates that the clock at the source node is running behind the clock at the destination node by the clock drift term, c. Substituting equation (2) into equation (3) results in the following equation:

$$T3 = T1 + S + d_t + c \tag{5}$$

Additionally, subtracting equation (4) from equation (5) results in the following relationships:

$$T3 - T4 = T1 - T3 + S + 2c \tag{6}$$

$$c = \frac{2T3 - T4 - T1 - S}{2} \tag{7}$$

Given the clock drift, c, in equation (7), a running average for the clock drift can be computed as follows:

$$C_{k+1} = \alpha C_k + (1-\alpha)c \tag{8}$$

In equation (8), the gain factor $\alpha$ is a value between 0 and 1. If $\alpha$ is large, then there is a faster convergence to the current value of c. If $\alpha$ is small, then there is a slower convergence to the current value of c. The clock drift computed according to equation (8) (or equation (7)) can be used to adjust the timing of the source node's clock in order to synchronize with the clock of the destination node (TOD synchronization).

Adding equation (4) and equation (5) and rearranging the terms results in the following relationship:

$$d_t = \frac{T4 - T1 - S}{2} \tag{9}$$

where $d_t$ represents the propagation delay between the source and destination nodes.

Similar to equation (8) above, a running average for the propagation delay can be computed as follows:

$$D_{k+1} = \alpha D_k + (1-\alpha)d_t \tag{10}$$

In equation (10), the gain factor $\alpha$ is a value between 0 and 1. If $\alpha$ is large, then there is a faster convergence to the current value of $d_t$. If $\alpha$ is small, then there is a slower convergence to the current value of $d_t$. Equations (8) and (10) can both be used to compute running averages at the source node. The purpose of the running averages in equations (8) and (10) is to smooth out the variations due to noise. Over the course of any time duration, the average is used either to update the clock delay or to update the propagation delay.

The above equations can be used to calculate the clock drift and propagation delay independently at the source node and the turn-around time S is a known value equal to the slot period. That is, at the source node, the clock drift can be computed without needing the value of the propagation delay. Similarly, at the source node, the propagation delay can be computed without needing the value of the clock drift. Equation (7) or (8) can be used at the source node to compute the clock drift using the known values of $T_1$, $T_4$, and S, while $T_3$ is sent to the source node from the destination node. Equation (9) or (11) can be used to compute the propagation delay using the known values of $T_1$, $T_4$, and S.

Referring again to FIG. 6, in operation 660, the one-way transmission of the timing packet from the source node to the neighboring node can be used by any neighboring node excluding the destination node to update the clock drift (the destination node need not update the clock drift, since the source node has already adjusted its clock to synchronize with the clock of the destination node). From equation (2), the clock drift, c, is computed to be:

$$c = T2 - T1 - d_t \tag{11}$$

In equation (11), $T_1$ is sent to each neighboring node in the original timing signal broadcast by the source node, while $T_2$ is measured at the neighboring node. The only unknown in equation (11) is the propagation delay $d_t$. The advantage of equation (11) is that T1 is known to the neighboring node from the reception of the timing packet from the source node. The estimate of the clock drift, c, therefore requires no knowledge of the inherent delays in the source node. However, there are a number of ways to estimate the propagation delay $d_t$ at the neighboring node. One is from RTS and CTS data exchanges, as described below. Another is from timing signal exchanges as given by Equation (9). All the neighboring communication devices serving as the receiving node can use equation (11) to estimate the clock drift c as long as the estimate of propagation delay $d_t$ is recent. Once an acceptably accurate estimate of propagation delay $d_t$ is available to the neighboring node and the clock drift has been computed, the neighboring node can compute the running average for the clock drift using equation (8) in the same manner as the source node. The clock drift computed according to equation (8) (or equation (7)) can be used to adjust the timing of the neighboring node's clock in order to synchronize with the clock of the source node.

There are a number of methods by which the destination node can estimate a value for the propagation delay $d_t$ in order to compute the clock drift using equation (11). As previously described, the communication device serving as the source node in the timing signal exchange has the necessary timing information (i.e., $T_1$ and $T_4$) to compute the propagation delay $d_t$, according to equation (9), to a neighboring node which has recently served as the destination node. If there are additional slots reserved for TDMA data traffic, one option for estimating the propagation delay $d_t$ in the neighboring node is for the source node to send its computed propagation delay $d_t$ to the neighboring node (again, assuming the computed propagation delay $d_t$ relates to that neighboring node). One potential opportunity for sending the propagation delay $d_t$ to the neighboring node is during a subsequent data transmission, which could be a broadcast message (e.g., the value of the propagation delay $d_t$ can be embedded in a field in the data transmission). This option is available if a data transmission between the source and neighboring node occurs within a certain period of time after a timing signal exchange with that neighboring node, so that the values of $T_1$ and $T_2$ are relatively recent and the time difference between the values $T_1$ and $T_2$ remains reasonably accurate. Once the propagation delay $d_t$ has been received by the neighboring node, the clock drift can be computed according to equation (11).

Again, if there are additional slots reserved for TDMA data traffic, another option is for the source node to provide an estimate of propagation delay $d_t$ to a neighboring node in advance of the timing signal exchange based on a recent data transmission exchange between the source node and that neighboring node. Here again, the propagation delay $d_t$ computation must be recent enough to support an accurate estimate of the clock drift.

The above-described computations can also be used to determine clock drift and propagation delay from RTS and CTS exchanges that precede a data transmission (i.e., a data transmission sequence that does not employ the time slots reserved exclusively for timing signals). Since channel access using RTS and CTS exchanges are used for time synchronization, the protocol given in IEEE 802.11 is briefly described. In this scheme, there are handshaking control signals between a source node and a destination node. This is done to help solve the hidden terminal problem. A source node (communication device) wishing to transmit data has to first send an RTS message to the destination node by randomly selecting a slot within a contention interval. At the time of the selected slot, the channel is monitored again to make sure the channel is free. If the channel is not free, the whole process repeats. When the channel is free, the source node sends an RTS message to the destination node. If the destination node is ready, it responds with a CTS message. Besides solving the hidden terminal problem, the exchanges of the RTS and CTS messages prevent long collisions of the message packet since the RTS and CTS messages are short control packets. If the source node successfully receives a CTS message, the channel reservation is complete. The source node then sends data packets to the destination node. Upon completion of the reception of the data packets, the destination node responds with an acknowledgement packet, ACK. However, if there are no frequent point-to-point (PTP) messages between a pair of nodes, the tracking of clock drift may be inaccurate and can be lost.

Figure 9:
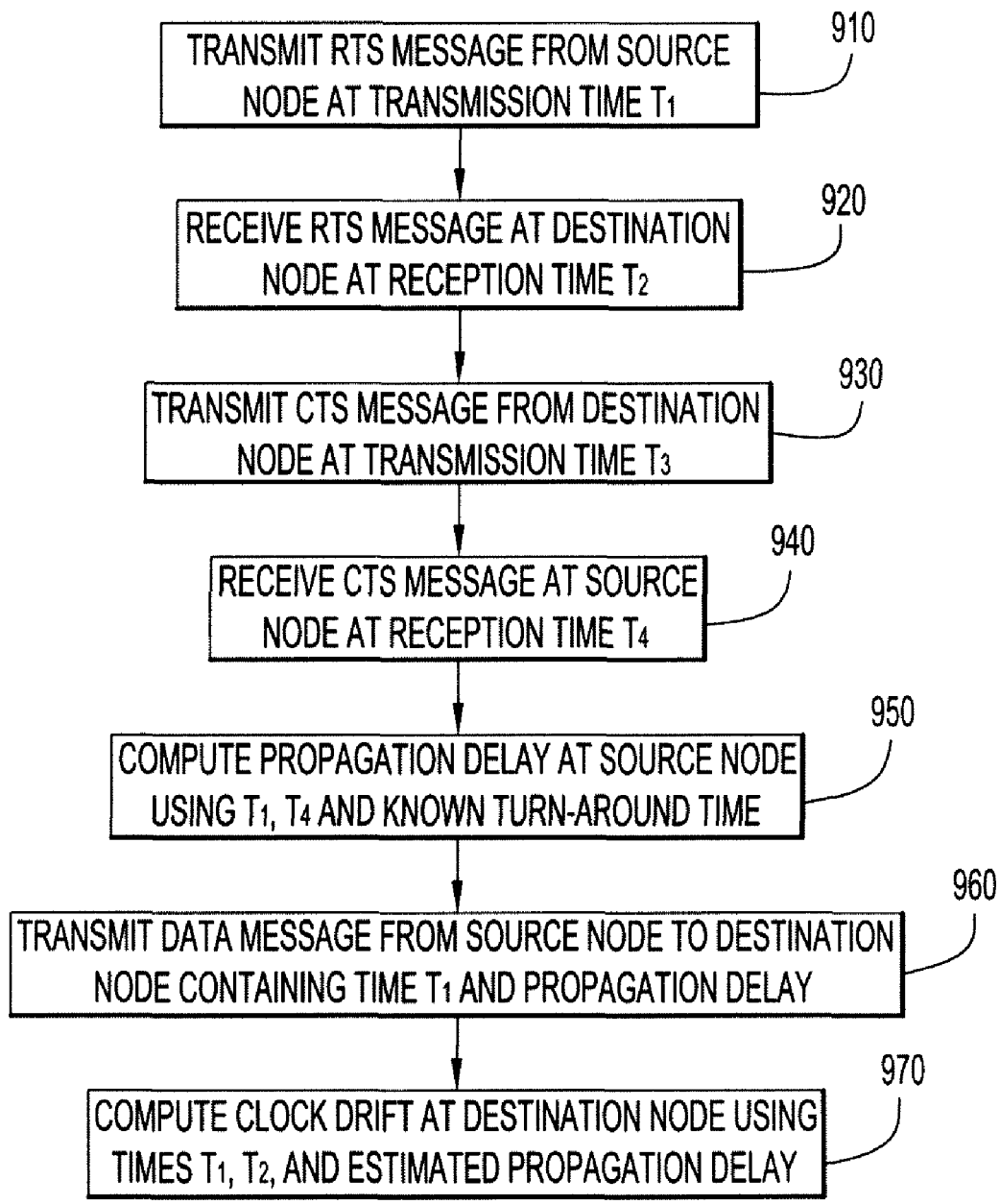
FIG. 9 is a functional flow diagram of operations performed by source and destination nodes in a CSMA environment to maintain clock synchronization.

Thus, for any PTP message in a CSMA environment, there must be RTS and CTS exchanges, and these exchanges can be used to assist in determining propagation delay and clock drift between two nodes, albeit in a somewhat different manner from the previously described TDMA scheme. FIG. 9 is a flow chart summarizing the operations performed to determine propagation delay and clock drift in a CSMA environment. The timing diagram is essentially the same as shown in FIG. 8; however, the exchanged signals are RTS and CTS messages rather than dedicated timing signals. Unlike the timing signals (see FIG. 7), the RTS and CTS messages do not include any field that contains the transmission time of the signal.

In operation 910, the source node transmits an RTS message at transmission time $T_1$. The RTS message is received by the destination node at reception time $T_2$ (operation 920). In operation 930, the destination node transmits the CTS message at time $T_3$, and at time $T_4$ the CTS message is received by the source node. Since $T_1$ and $T_4$ are known to the source node and since determination of the propagation delay between the source and destination nodes requires knowledge of only times $T_1$, $T_4$, and the known turn-around time (e.g., a slot period S where TDMA or time slotting is used), in operation 950 the source node can still use equation (9) to compute the propagation delay $d_t$. Note, however, that the source node cannot compute clock drift, since the transmission time $T_3$ of the CTS message, which is required to compute clock drift, is not supplied to the source node in this case.

Once the source node computes the propagation delay $d_t$ after the reception of the CTS message, in operation 960, the source node sends both propagation delay $d_t$ and time $T_1$ to the destination node during the subsequent PTP data transmission (note that, in this context, dedicated timing signals are not being used, so the source node would not have provided the value of time $T_1$ to the destination node in the RTS message). After the data is received, both time $T_1$ and the propagation delay $d_t$ are known to the destination node, which can then compute the clock drift according to equation (11) in operation 970. In other words, for RTS and CTS exchanges, the source node estimates the propagation delay $d_t$ according to Equation (9) and that, in turn, is used at the destination node to estimate the clock drift according to Equation (11). As an added bonus, the destination node also obtains the propagation delay due to the transmission from the source node. Note again that, in the context of RTS and CTS exchanges, the source node does not have the opportunity to compute clock drift, since the destination node does not supply time $T_3$ to the source node. However, so long as one of the two nodes can compute clock drift, the two nodes can be synchronized.

For one way HRTS transmissions, time $T_1$ is not sent to the neighboring nodes of the source node via the HRTS message; thus, the neighboring nodes would need to estimate time $T_1$ by assuming the neighboring node and source node have the same delays from the beginning of a time slot to the start of transmission (SOT). The neighboring node would have to further assume that there is close alignment at the beginning of the slot for both the source and neighboring node. These unknown factors can result in an inaccurate estimate of clock drift; thus, this technique may not be suitable in certain systems.

Example 1

The following example helps illustrate the time synchronization techniques of the present invention in a TDMA environment. The techniques described in this example can be performed by one or more communication devices located at any point throughout the network environment, such as, but not limited to, one or more of the devices shown in FIG. 1 and FIG. 2.

This example assumes that the slot period, S, is 1.5 ms and that each epoch is 90 ms. The example further assumes that each super epoch has 4 epochs, so that N=4, and that at a time 360 sec is aligned with the super epoch boundary. Thus, each super epoch period is 0.36 sec. Timing signals are sent at the first two slots of each super epoch; thus, the points in time at which the timing packets could be sent are: 360 sec., 360.0015 sec., 360.36 sec., 360.3615 sec., 360.72 sec., 360.7215 sec., and so on. The example assumes a 10-node network with successful network formation in the acquisition mode and that all the clocks are synchronized. In the tracking mode, it is still necessary to monitor the clocks to make sure that they remain aligned. Suppose node 2 finds node 1 having the most recent clock update and node 3 finds node 2 having the most recent clock update.

Each node initiates its transmission of timing signals according to Equation (1). Suppose node 2 is scheduled to transmit a timing signal at t=360.2 sec. Since t is greater than 360.0015 sec, node 2 must wait until t=360.36 sec (i.e., the next instance of time slots reserved for timing signals). Notwithstanding possible hardware-related delay, the packet is sent out at t=360.36 sec. Node 2 then loads T1=360.36 sec into the timing field of the timing packet, the source ID corresponding to node 2 into the source field of the timing packet, the source ID corresponding to node 1 into the destination field of the timing packet, and the value "1" into the response field of the timing packet. Node 2 then transmits the packet to node 1.

Assume the distance between node 2 and node 1 is 1 km and the propagation delay is 3.33 µs. Suppose further that node 1's clock runs ahead of node 2's clock by 2 µs. Based upon the node 1 clock, node 1 starts receiving the packet at T2=360.36 sec+3.33 µs+2 µs=360.36000533 sec. Since the response field of the timing packet is set to "1," node 1 has to respond with a replay timing signal. Node 1 waits until S=1.5 ms later (i.e., the next time slot) to send the response packets. Time S=1.5 ms is long enough to account for possible processing delay, turnaround delay and the reception of the entire packet. Node 1 then loads T3=360.36150533 into the timing field of the response packet of the reply timing signal, the source ID corresponding to node 1 into the source field of the response packet, the source ID corresponding to node 2 into the destination field of the response packet, and the value "0" into the response field of the response packet. Node 1 then transmits the response packet to node 2.

After a propagation delay of 3.33 µs, node 2 receives the response packet at T4=360.36150533 sec+3.33 us−2 µs=360.36150666 sec based upon the node 2 clock which is running behind by 2 µs. Since the response field of the response packet is zero, node 2 does not respond with any further timing signals. Instead, node 2 can compute the clock drift and propagation delay based upon the information now available to node 2, i.e., T1, T3, and T4. Based upon equation (9), the propagation delay is computed at the source node to be (360.36150666−360.360−0.0015)/2=3.33 µs. Based upon equation (7), the clock drift is computed at the source node to be (2*360.36150533−360.36150666−360.360−0.0015)/2=2 µs. In other words, node 2 can adjust its clock by 2 µs and update its propagation delay to node 1 to be 3.33 µs.

Based upon the scheduling dictated by equation (1), node 3 could send timing packets to node 2 at a later time. Following the same procedure as described above, node 3 can then align its clock to node 2. This process repeats and eventually every node gets a chance to update its clock.

Example 2

The following describes an example to illustrate the time synchronization techniques of the present invention in a CSMA environment. The techniques described in this example can be performed by one or more network devices located at any point throughout the network environment, such as, but not limited to, one or more of the devices shown in FIG. 1 and FIG. 2.

The same assumptions for Example 1, above, are incorporated herein. The available point-to-point packet transmission using CSMA/CA is considered as a bonus to computing the clock drift. Assume at T1=364.341 sec, node 5 sends point-to-point packet to node 4 and the propagation distance between node 5 and node 4 is again 1 km. The relationships among T1, T2, T3, and T4 are the same as in Example 1 and T2=364.34100533 sec, T3=364.34250533 sec and T4=364.34250666 sec. Node 5 first sends an RTS to node 4 at T1=364.341 sec. Node 4 responds with CTS to node 5 at T3, and node 5 receives the CTS at T4. Since there is no timing information embedded in the RTS and CTS messages, node 5 is not aware of T3 and cannot compute clock drift. However, node 5 can compute propagation delay based upon equation (9) since only T4 and T1 are needed. Based on equation (9), the propagation delay is 3.33 µs. Node 5 then updates its propagation delay to node 4.

After successfully receiving the CTS, node 5 then sends a data transmission with a data packet two slots later from T1 at T5=364.341+2*0.0015=364.3440 sec. This is because the first two slots are reserved for RTS and CTS while the third slot is reserved for data. However, both T1=364.41 sec and propagation delay=3.33 µs are added to the data field and sent from node 5 to node 4. After node 4 receives the data packet, the values 364.341 sec and 3.33 µs are extracted. Node 4 then computes the clock drift based upon equation (11) as 364.34100533−364.341−0.00000333=2 µs. Note that the computation of propagation delay at node 5 and the computation of clock drift at node 4 are all accurate. Node 4 also obtains the propagation delay from node 5.

Figure 10:
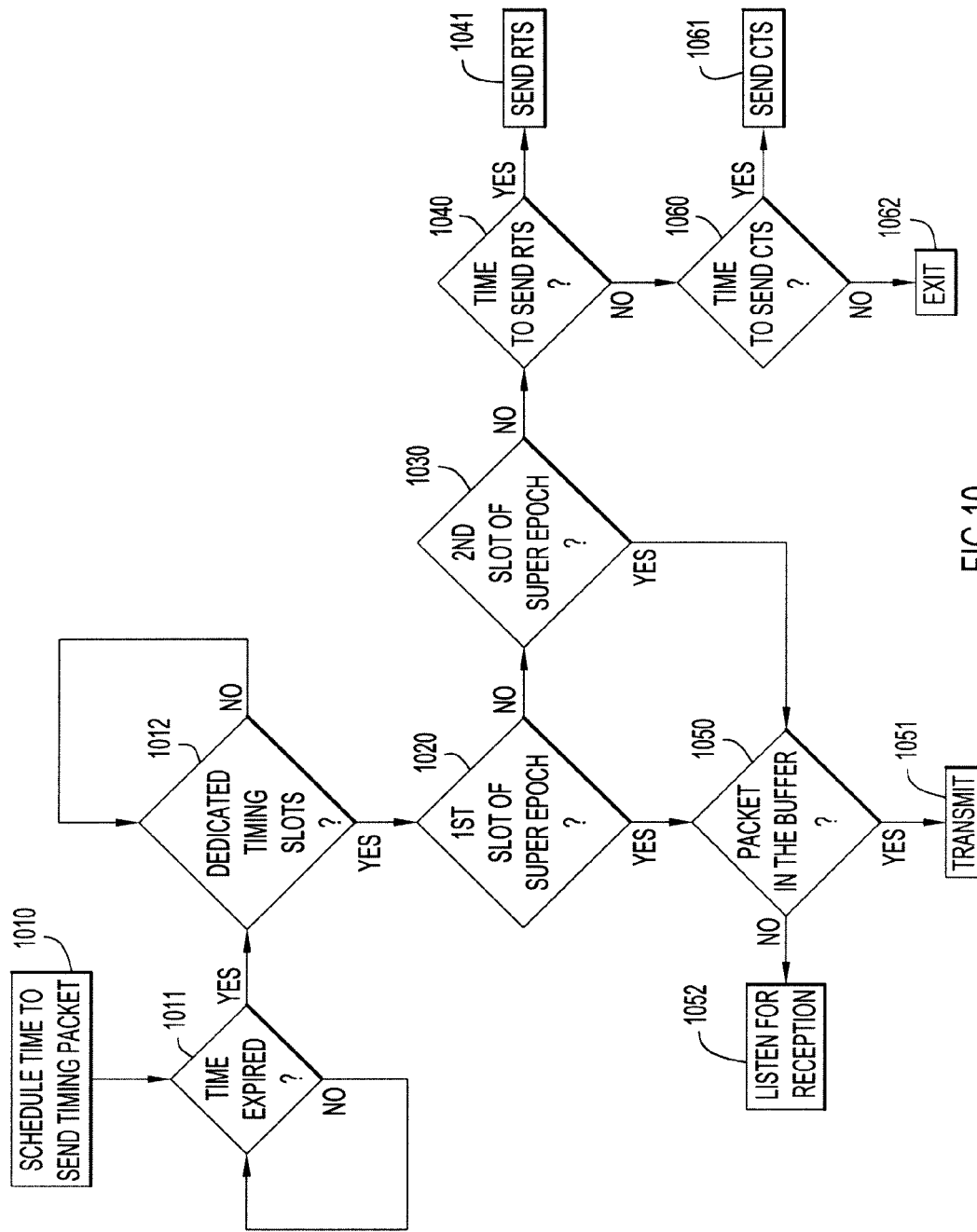
FIG. 10 is a flow diagram summarizing operational logic employed within a communication device to schedule transmission of packets, including timing signals.

FIG. 10 is a flow diagram summarizing decision logic within a communication device for scheduling transmission of packets, including timing packets. In operation 1010, scheduling of transmission of a timing packet is performed using, for example, equation (1). In operation 1011, the schedule timer is monitored. Upon expiration of the timer in operation 1011, in operation 1012, the node waits for the next designated time slots. Upon reaching the time for the next time slots designated for timing signals, it is determined whether the current time slot is the first or second time slot of the super epoch (conditions 1020 and 1030). If so, if there is a timing packet in the buffer (condition 1050), then the timing packet is transmitted (operation 1051). If there is not a timing packet in the buffer, the communication device listens for reception of a timing packet (operation 1052). If the current time slot is neither the first nor second slot of the super epoch (conditions 1020 and 1030), if it is time to send an RTS message (condition 940), the communication device sends an RTS message (operation 1041). If it is not time to send an RTS message (condition 1040) and it is time to send a CTS message, the communication device sends a CTS message (operation 1061).

Figure 11:
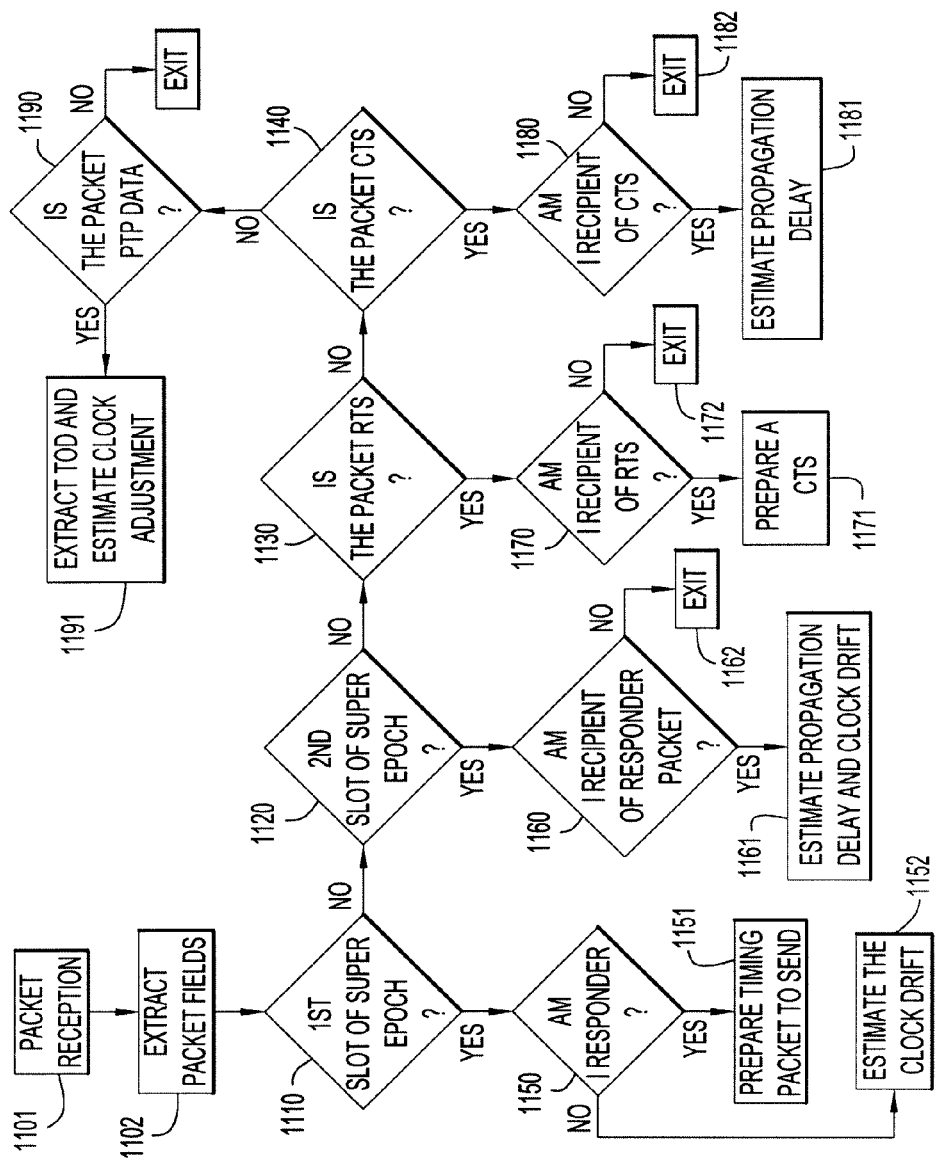
FIG. 11 is a flow diagram illustrating operational logic employed within a communication device to handle reception of packets, including timing signals.

FIG. 11 shows a flow diagram summarizing decision logic within a communication device for packet reception. The communication device receives a packet (operation 1101) and extracts all of the relevant fields from the packet (operation 1102). If the packet arrived in the first time slot of a super epoch (condition 1110), the packet is assumed to be a timing packet. In this case, the communication device determines whether it is the responder, i.e., the intended destination node (condition 1150) and if so, the communication device prepares a time packet to send (operation 1151). If the receiving node is not the responder, it can estimate the clock drift based upon the most recent estimate of propagation delay, the transmission time of the timing signal, and the reception time of the timing signal (operation 1152).

If the arrival time of the packet was not during the first time slot of the super epoch (condition 1110) but was during the second time slot of the super epoch (condition 1120), if the communication device is the intended recipient of a responder packet, i.e., the source node (condition 1161), the communication device estimates propagation delay and clock drift, as described above. If the arrival time of the packet was not during the first or second time slot of the super epoch (conditions 1110 and 1120), if the packet is an RTS message (condition 1130) and the communication device is the intended recipient (condition 1170), then the communication device prepares a CTS message. If the packet is not an RTS (condition 1130) but is a CTS message (condition 1140), if the communication device is the intended recipient of the CTS message, the communication device estimates propagation delay (operation 1181). If the packet is not a CTS message (condition 1140), if the packet is a data message, the communication device extracts the time $T_1$ and estimated clock adjustment from the data packet.

Thus, if the packet is received at the second slot of a super epoch, a check is made as to whether the receiving node is the original source node. If so, both the clock drift and propagation delay are computed. If the timing packet is not received in either the first time slot or the second time slot, the RTS and CTS exchanges that precede regular PTP communications are used to estimate propagation delay and clock drift. The source node estimates the propagation delay from the reception of the CTS, and the destination node extracts the TOD field and estimates the clock drift when the data is received.

The techniques provided herein can be applied to any commercial and military products, especially those that do not use GPS for clock synchronization. Moreover, the techniques of the present invention can be used in pair-wise and global synchronization schemes, including level-based synchronization and diffuse-based global synchronization schemes.

In the foregoing specification, embodiments of the invention have been described with reference to specific exemplary embodiments thereof. It will be evident that various modifications may be made thereto without departing from the broader spirit and scope of the invention as set forth in the following claims. Although specific terms are employed herein, they are used in a generic and descriptive sense only and not for purposes of limitation.

What is claimed is:

1. A method for maintaining time synchronization between network nodes, the method comprising:
broadcasting a timing signal from a source node to neighboring nodes subsequent to an initial synchronization of the source node with respect to the neighboring nodes, the timing signal being broadcast in a dedicated source time slot of a super epoch comprising a plurality of epochs each having a plurality of fixed time slots, wherein the timing signal indicates a transmission time of the timing signal and a destination node designated for response;
receiving a reply timing signal at the source node from the neighboring node designated as the destination node, the reply timing signal being received in a dedicated destination time slot of the super epoch, wherein the reply timing signal indicates a transmission time of the reply timing signal;
computing at the source node a propagation delay between the source and destination nodes based on the transmission time of the timing signal and a reception time of the reply timing signal; and
computing at the source node a clock drift based on the transmission time of the timing signal, the transmission time of the reply timing signal, and the reception time of the reply timing signal.

2. The method of claim 1, wherein the dedicated source time slot of the super epoch is adjacent to the dedicated destination time slot of the super epoch, and wherein the propagation delay and clock drift are computed further based on a time slot period.

3. The method of claim 1, wherein broadcasting of the timing signal by the source node is scheduled according to a timer given by:

$$\text{Timer} = T_a + \text{random}(T_b * N_{nbr})$$

where $T_a$ is a minimum time separation for sending timing packets, $N_{nbr}$ is the number of neighboring nodes for the source node, and $T_b$ is a time parameter for controlling neighbor transmission.

4. The method of claim 1, wherein the clock drift c is computed by:

$$c = \frac{2T3 - T4 - T1 - S}{2}$$

where T1 is the transmission time of the timing signal, T3 is the transmission time of the reply timing signal, T4 is the reception time of the reply timing signal, and S is a time slot period.

5. The method of claim 1, wherein a running average of clock drift $C_{k+1}$ is computed by:

$$C_{k+1} = \alpha C_k + (1-\alpha)c$$

where $\alpha$ is a gain factor between 0 and 1, c is the clock drift and $C_k$ is a previously computed value of the running average of clock drift.

6. The method of claim 1, wherein the propagation delay $d_t$ is computed by:

$$d_t = \frac{T4 - T1 - S}{2}$$

where T1 is the transmission time of the timing signal, T4 is the reception time of the reply timing signal, and S is a time slot period.

7. The method of claim 1, wherein a running average of propagation delay $D_{k+1}$ is computed by:

$$D_{k+1}=\alpha D_k+(1-\alpha)d_t$$

where α is a gain factor between 0 and 1, $d_t$ is the propagation delay, and $D_k$ is a previously computed value of the running average of propagation delay.

8. A communication device operable as a source node for maintaining time synchronization in a network, the communication device comprising:
- a transmitter configured to broadcast a timing signal to neighboring nodes subsequent to an initial synchronization of the communication device with respect to the neighboring nodes, the timing signal being broadcast in a dedicated source time slot of a super epoch comprising a plurality of epochs each having a plurality of fixed time slots, wherein the timing signal indicates a transmission time of the timing signal and a destination node designated for response;
- a receiver configured to receive a reply timing signal from the neighboring node designated as the destination node, the reply timing signal being received in a dedicated destination time slot of the super epoch, wherein the reply timing signal indicates a transmission time of the reply timing signal; and
- a processor configured to compute: a propagation delay between the communication device and the destination node based on the transmission time of the timing signal and a reception time of the reply timing signal; and a clock drift based on the transmission time of the timing signal, the transmission time of the reply timing signal, and the reception time of the reply timing signal.

9. The communication device of claim 8, wherein the dedicated source time slot of the super epoch is adjacent to the dedicated destination time slot of the super epoch, and wherein the propagation delay and clock drift are computed further based on a time slot period.

10. The communication device of claim 8, wherein the communication device schedules broadcasting of the timing signal according to a timer given by:

$$\text{Timer}=T_a+\text{random}(T_b*N_{nbr})$$

where $T_a$ is a minimum time separation for sending timing packets, $N_{nbr}$ is the number of neighboring nodes for the communication device, and $T_b$ is a time parameter for controlling neighbor transmission.

11. The communication device of claim 8, wherein the processor computes clock drift c by:

$$c = \frac{2T3 - T4 - T1 - S}{2}$$

where T1 is the transmission time of the timing signal, T3 is the transmission time of the reply timing signal, T4 is the reception time of the reply timing signal, and S is a time slot period.

12. The communication device of claim 8, wherein the processor computes a running average of clock drift $C_{k+1}$ by:

$$C_{k+1}=\alpha C_k+(1-\alpha)c$$

where α is a gain factor between 0 and 1, c is the clock drift and $C_k$ is a previously computed value of the running average of clock drift.

13. The communication device of claim 8, wherein the processor computes the propagation delay $d_t$ by:

$$d_t = \frac{T4 - T1 - S}{2}$$

where T1 is the transmission time of the timing signal, T4 is the reception time of the reply timing signal, and S is a time slot period.

14. The communication device of claim 8, wherein the processor computes a running average of propagation delay $D_{k+1}$ by:

$$D_{k+1}=\alpha D_k+(1-\alpha)d_t$$

where α is a gain factor between 0 and 1, $d_t$ is the propagation delay, and $D_k$ is a previously computed value of the running average of propagation delay.

15. A computer-readable memory storing instructions to maintain time synchronization between network nodes that, when executed by a processor, cause the processor to:
- send instructions to broadcast a timing signal from a source node to neighboring nodes subsequent to an initial synchronization of the source node with respect to the neighboring nodes, the timing signal being broadcast in a dedicated source time slot of a super epoch comprising a plurality of epochs each having a plurality of fixed time slots, wherein the timing signal indicates a transmission time of the timing signal and a destination node designated for response;
- process a reply timing signal received at the source node from the neighboring node designated as the destination node, the reply timing signal being received in a dedicated destination time slot of the super epoch, wherein the reply timing signal indicates a transmission time of the reply timing signal;
- compute a propagation delay between the source and destination nodes based on the transmission time of the timing signal and a reception time of the reply timing signal; and
- compute a clock drift based on the transmission time of the timing signal, the transmission time of the reply timing signal, and the reception time of the reply timing signal.

* * * * *